United States Patent [19]
Yang et al.

[11] Patent Number: 6,162,354
[45] Date of Patent: Dec. 19, 2000

[54] INTEGRATED CHECK VALVE/STRAINER-FILTER ASSEMBLY

[75] Inventors: Biing Huang Yang, Hsin Chu; Jiann Jong Wang, Shinchu; Ming Shi Ni, Taipei; Shao Wei Ku, Hsinchu; Wei Cheng Lee, Taipei; Ta Jung Feng, Chu-Tung; Yi Lang Ku, Miao-Li Hsien, all of Taiwan

[73] Assignee: Taiwan Semiconductor Manufacturing Company, Ltd, Hsin Chu, Taiwan

[21] Appl. No.: 09/204,733

[22] Filed: Dec. 3, 1998

[51] Int. Cl.[7] .................................................. B01D 35/153
[52] U.S. Cl. ........................... 210/136; 55/424; 210/447; 210/459
[58] Field of Search ..................................... 210/136, 435, 210/446, 447, 448, 459; 55/424, 417, 420

[56] References Cited

U.S. PATENT DOCUMENTS

| 142,438 | 9/1873 | Chapman | 210/136 |
| 493,378 | 3/1893 | Gibson | 210/136 |
| 719,913 | 2/1903 | Wackerow | 210/136 |
| 748,821 | 1/1904 | Wackerow | 210/136 |
| 5,972,210 | 10/1999 | Munkel | 210/136 |

*Primary Examiner*—Joseph W. Drodge
*Attorney, Agent, or Firm*—Tung & Associates

[57] ABSTRACT

An integrated check valve/strainer-filter assembly that combines a check valve with a strainer-filter assembly in a compact structure is provided. The novel assembly provides the benefits of floor space savings and low maintenance costs. A strainer-filter element may be mounted in a removable strainer-filter housing to provide easy access to the element for cleaning or replacement. The check valve may be installed at one of three desirable positions thus affording additional flexibility of the present invention novel apparatus.

11 Claims, 3 Drawing Sheets

INTEGRATED CHECK VALVE/STRAINER-FILTER ASSEMBLY

FIELD OF THE INVENTION

The present invention generally relates to a check valve and a strainer-filter mounted in a conduit for transporting a fluid and more particularly, relates to an integrated check valve/strainer-filter assembly that performs the functions of both a check valve and a strainer filter in a compact structure for transporting and filtering a liquid or a gas which requires a minimal amount of floor space for installation and presents a low probability of fluid leakage.

BACKGROUND OF THE INVENTION

In a manufacturing facility, various chemicals in gaseous and liquid form are used in various fabrication processes. For instance, in a semiconductor fabrication plant, a semiconducting substrate must be processed in a multiplicity of manufacturing steps, i.e., as many as several hundred in order to complete an integrated circuit chip. The multiplicity of manufacturing steps may include cleaning, cooling, deposition, etching and any other necessary processing steps. A variety of chemicals, including liquids and gases must be used in these steps. For instance, to clean or cool a process chamber or a wafer platform, to etch a specific feature on a substrate, to clean after each etching or deposition steps, to deposit layers of materials on a substrate, or to carry out any other processes.

The variety of chemicals used in a semiconductor facility must be handled with care since some of the processing chemicals are highly toxic and/or highly corrosive. For instance, strong acids are frequently used in an etcher for the etching of metals for forming a conductive path. Since hazardous materials are not always all consumed in chemical processes, unused hazardous chemicals must be recycled or otherwise disposed of. Due to their hazardous nature, the materials must be carefully handled during their storage and transportation to avoid personal injuries and potential fire hazard. The mechanical components used in transporting these materials should therefore be minimized such that potential exposure of personnel to the chemicals may be reduced.

In a modern semiconductor fabrication plant, the fabrication process for an IC chip is carried out in a clean room atmosphere which is very tightly controlled to avoid any possibility of contamination. The floor space in a clean room is therefore very valuable considering the large number of processing equipment that must be utilized in fabricating an IC chip. There is a great incentive in reducing the floor space occupied by the processing equipment and any auxiliary equipment such as conduits connecting between the processing equipment and chemical storage facilities.

In transporting chemicals in a semiconductor fabrication facility, a number of check valves, or one-way valves are used in conduits in order to prevent possible back-flow of the chemical and possible contamination of the chemical storage tank reservoir. In transporting chemicals of either a liquid or a gas, a strainer or filter is frequently used in the conduit for straining or filtering out solid residues or other contaminants which may be present in the liquid or gas. For instance, in transporting a cooling water to a process machine, a large diameter, i.e., between 5 cm and 20 cm conduit is normally used. Since the water supply line may run a length of at least 50 or 60 cm, at least one-way valve and strainer-filter may be required to ensure a supply of clean cooling water to the process machine. The floor space occupied by the at least one one-way valve and strainer-filter may be significant.

It is therefore an object of the present invention to provide check valves and strainer-filters for use in a semiconductor fabrication facility that are compact in size, occupy a minimum floor space for installation, and present a low probability of fluid leakage.

It is another object of the present invention to provide an integrated check valve/strainer-filter assembly that combines the functions of a one-way valve and a strainer-filter in a single compact unit.

It is a further object of the present invention to provide an integrated check valve/strainer-filter assembly wherein a check valve and a strainer-filter are mounted together in a single compact unit with the strainer-filter housing being removable for cleaning or replacement of a filter element.

It is another further object of the present invention to provide an integrated check valve/strainer-filter assembly wherein a strainer-filter housing is mounted to an elongated conduit containing a check valve perpendicularly to a longitudinal axis of the conduit.

It is still another object of the present invention to provide an integrated check valve/strainer-filter assembly that is equipped with a flanged opening which can be opened for cleaning or servicing the strainer-filter element.

It is yet another object of the present invention to provide an integrated one-way valve/filter assembly for conveying and filtering a fluid flowing therethrough consisting of an elongated conduit, a filter housing removably mounted to the conduit and a one-way valve mounted in a fluid passage in the conduit.

It is still another further object of the present invention to provide an integrated one-way valve/filter assembly for conveying and filtering a fluid flowing therethrough wherein the filter housing is removably joined to the conduit for allowing the housing to be removed for service.

It is yet another further object of the present invention to provide an integrated one-way valve/filter assembly for conveying and filtering a fluid flowing therethrough which further includes an opening in the conduit for providing an access to the filter and a cover for sealingly engaging the opening.

SUMMARY OF THE INVENTION

In accordance with the present invention, an integrated check valve/strainer-filter assembly for conveying and filtering a fluid flowing therethrough is provided.

In a preferred embodiment, an integrated check valve/strainer-filter assembly can be provided which includes an elongated conduit that has an inlet and an outlet connecting a fluid passageway thereinbetween, a strainer-filter joined to the conduit and being in fluid communication with the inlet and the outlet, and a check valve positioned in the fluid passageway between the inlet and the outlet allowing a fluid flow from the inlet to the outlet by passing through the strainer-filter.

The strainer-filter may further include a strainer-filter housing removably and sealingly engaging the elongated conduit, a cavity contained in and defined by the housing for receiving a strainer-filter element, and a strainer-filter element positioned in the cavity. The assembly may further include an opening in the elongated conduit and a flanged cover for sealingly engaging the opening. The engagement between the flanged cover and the opening may be provided by thread means. The flanged cover may be removed from the elongated conduit for removing a strainer-filter element in the strainer-filter. The flanged cover may further be removed from the elongated conduit for servicing an interior of the elongated conduit. The strainer-filter housing may be joined perpendicularly to a longitudinal axis of the conduit. The assembly may be used for conveying gas or liquid. The strainer-filter housing may be removed for servicing or replacing the strainer-filter element. The strainer-filter housing may be joined to the elongated conduit by a mechanical method.

In another preferred embodiment, an integrated one-way valve/filter assembly for conveying and filtering a fluid flowing therethrough is provided which is constructed by a conduit that has an elongated body, an inlet and an outlet providing a fluid passageway therethrough, a filter joined to the conduit and in fluid communication with the inlet and the outlet, the filter further includes a filter housing sealingly engaging the conduit and defining a cavity contained therein for receiving a filter element, and a one-way valve mounted in the fluid passageway between the inlet and the outlet allowing a uni-directional fluid flow from the inlet to the outlet passing through the filter.

The filter may be a combination strainer-filter that is effective is straining and filtering a fluid. The filter may be removably joined to the conduit for allowing the filter housing to be removed for service. The assembly may further include an opening in the conduit for providing an access to the filter and a cover for sealingly engaging the opening. The cover may sealingly engaging the opening by thread means. The fluid conveyed and filtered by the integrated one-way valve/filter assembly may be a gas or a liquid. The filter may be threadingly joined to the conduit such that it may be removed for replacement of the filter element. The filter may further be joined to the conduit in such a way that it is perpendicular to a longitudinal direction of the conduit.

BRIEF DESCRIPTION OF THE DRAWINGS

Other objects, features and advantages of the present invention will become apparent upon consideration of the specification and the appended drawings, in which.

DETAILED DESCRIPTION OF THE PREFERRED EMBODIMENTS

The present invention discloses an integrated check valve/strainer-filter assembly consists of a one-way valve and a strainer-filter mounted together in a compact assembly for saving floor space occupied by a transporting conduit for a fluid and the cost of maintaining and servicing the assembly. Since the one-way valve and the strainer-filter are both widely used in chemical processing equipment, i.e., for feeding a fluid of either gas or liquid to a process equipment, the present invention novel apparatus can save significant floor space and costs for maintaining the processing equipment.

Figure 1A:
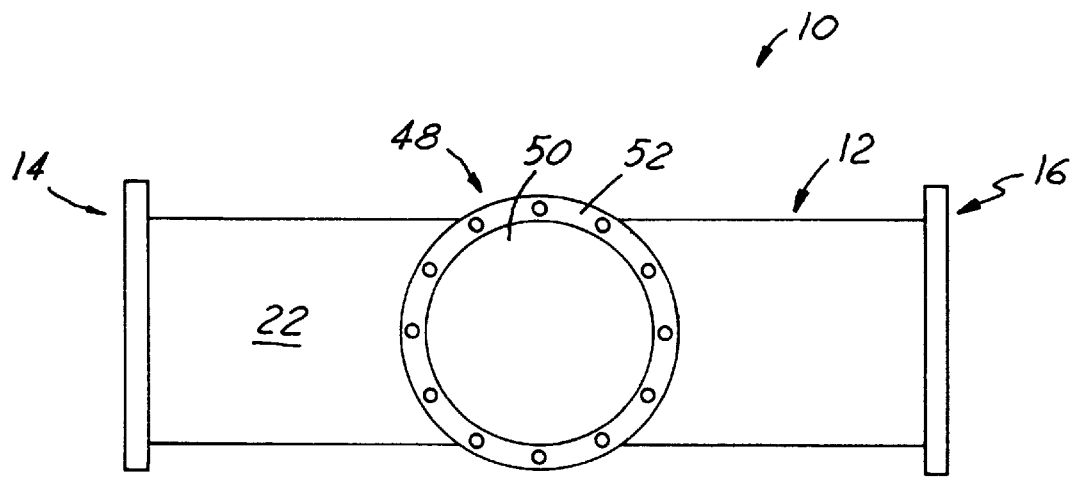
FIG. 1A is a plane view of a first preferred embodiment of the present invention check valve/strainer-filter assembly.
Figure 1B:
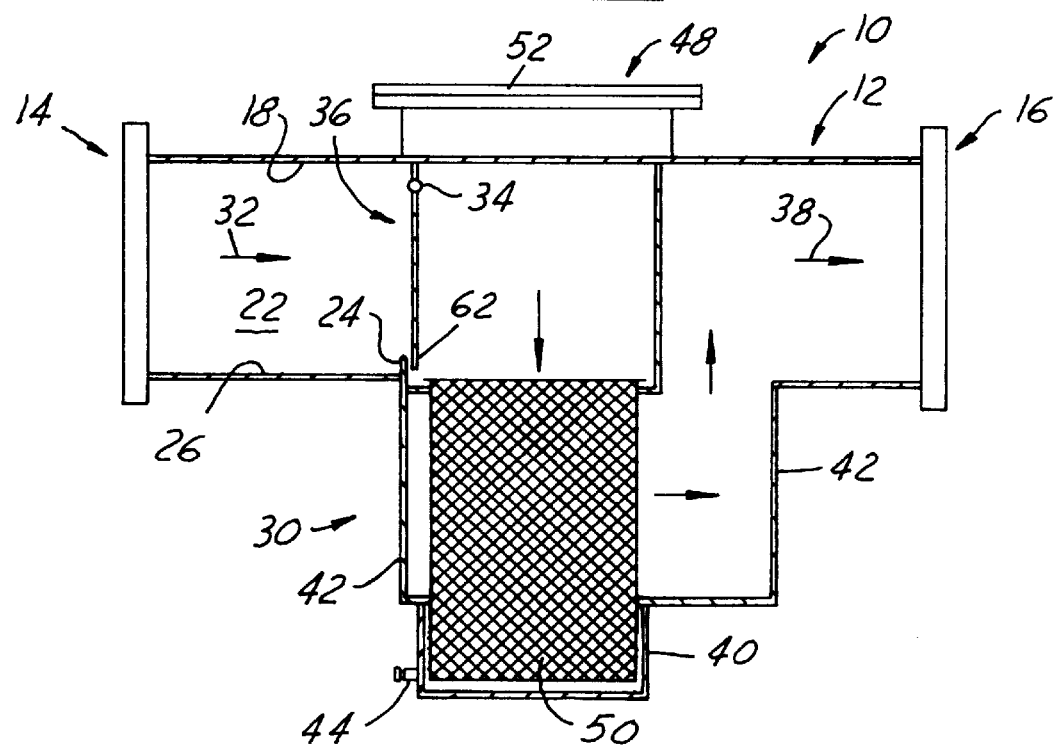
FIG. 1B is a cross-sectional view of the first preferred embodiment of the present invention integrated check valve/strainer-filter assembly.

Referring initially to FIGS. 1A and 1B wherein a plane view and a cross-sectional view of a first preferred embodiment of the present invention integral check valve/strainer-filter assembly 10 is shown. The assembly 10 is constructed by an elongated conduit 12 which has a fluid inlet 14 and a fluid outlet 16 for forming a fluid passageway 22 thereinbetween, a strainer-filter 30 that is joined to the elongated conduit 12 and is in fluid communication with the inlet 14 and the outlet 16, and a check valve 36 positioned in the fluid passageway 22 between the inlet 14 and the outlet 16 to allow a fluid flow 32 from the inlet 14 to the outlet 16 by passing through the strainer-filter 30. The check valve 36 is a one-way check valve having one peripheral edge 34 mounted to an inner wall 18 of the elongated conduit 12 while the remaining peripheral edge 3 8 overlaps a baffle plate 24 mounted along an inner peripheral surface 26 of the elongated conduit 12 such that a fluid-tight seal is formed. The check valve 36 is mounted such that only a uni-directional movement, i.e., a movement of swinging toward the outlet 16 as shown in FIG. 1B, is allowed. The check valve 36 therefore effectively prevents any fluid, i.e., either gas or liquid, which may have been exposed to the environment of the process chamber and may have been contaminated from flowing back into a clean fluid reservoir (not shown). For instance, the fluid flow 32 represents a clean supply of the fluid, while fluid 38 represents a fluid flow which may have been contaminated by the process chamber environment.

The present invention novel apparatus is formed by removably mounting a strainer-filter housing 40 to a fixed strainer-filter housing 42 such that the removable section 40 of the housing may be advantageously removed to allow service or replacement of a strainer-filter element 50 contained therein. The removable section 40 of the strainer-filter housing may further be provided with a drain port 44 for draining liquid collected in the strainer-filter element 50. When the fluid flow is a gas, the drain port 44 may further serve the function as a pressure release valve to prevent an unacceptable pressure built up in the elongated conduit 12.

The filter element 50 used in the strainer-filter 30 may be suitably manufactured of any materials. For instance, when the fluid flow 32 flowing through the passageway 12 is a gas such as nitrogen or oxygen, fibrous filter elements may be used to retain particles in the gas flow. When the fluid flow 32 through the passageway 22 is a liquid, for instance water, a metal type of filter in a mesh construction may be suitably used. The removable housing 40 may be engaged to the non-removable housing 42 of the strainer-filter by any mechanical means. One of such suitable mechanical means is by mechanical threads such that the removable section 40 may be screwed therein.

As shown in FIG. 1B, a fluid flow 32 enters the fluid inlet 14 and then first passing the check valve 36 before it enters into the strainer-filter element 50 in a downward direction. The particles or moisture content of a gas or the particle content of a liquid is retained by the filter element 50 or by the removable housing 40 while a clean fluid exits to the right of the filter element 50. The clean fluid then travels upwardly toward the fluid exit 16 to a destination such as a cavity of a process chamber (not shown).

The present invention integrated check valve/strainer-filter assembly 10 is further equipped with a flanged top 48 which provides an access to the strainer-filter element 50 or to the interior passageway 22 of the conduit 12. The flanged cover 52 can be easily removed by, for instance, thread means for easy access in a cleaning or maintenance procedure of the present invention assembly 10. The elongated conduit 12, the flanged cover 52 and the strainer-filter housing 40, 42 should be fabricated of a material that is sufficiently resistant to corrosive gases or liquids. For instance, stainless steel may be suitably used for such purpose. A plastic material such as Teflon may further be used for such purpose as long as a high vacuum seal may be maintained by a conduit made of such material.

Figure 2A:
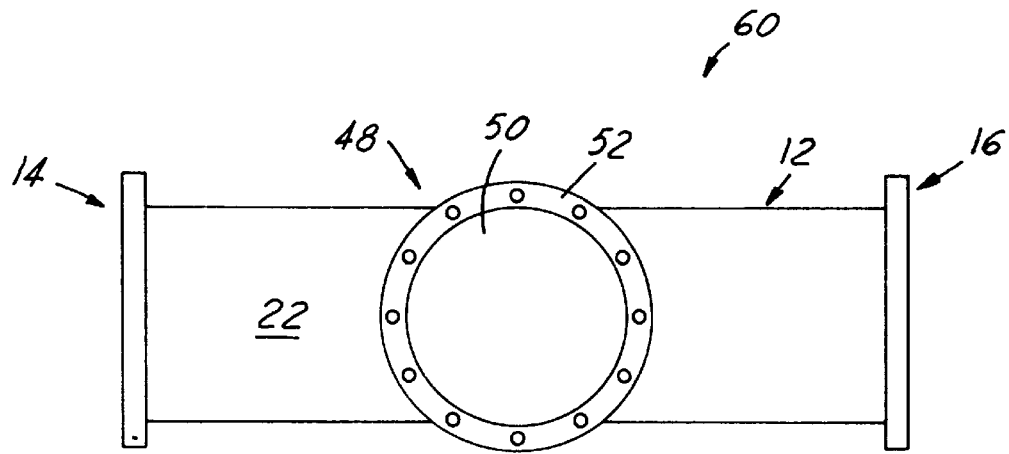
FIG. 2A is a plane view of a second preferred embodiment of the present invention integrated check valve/strainer-filter assembly.
Figure 2B:
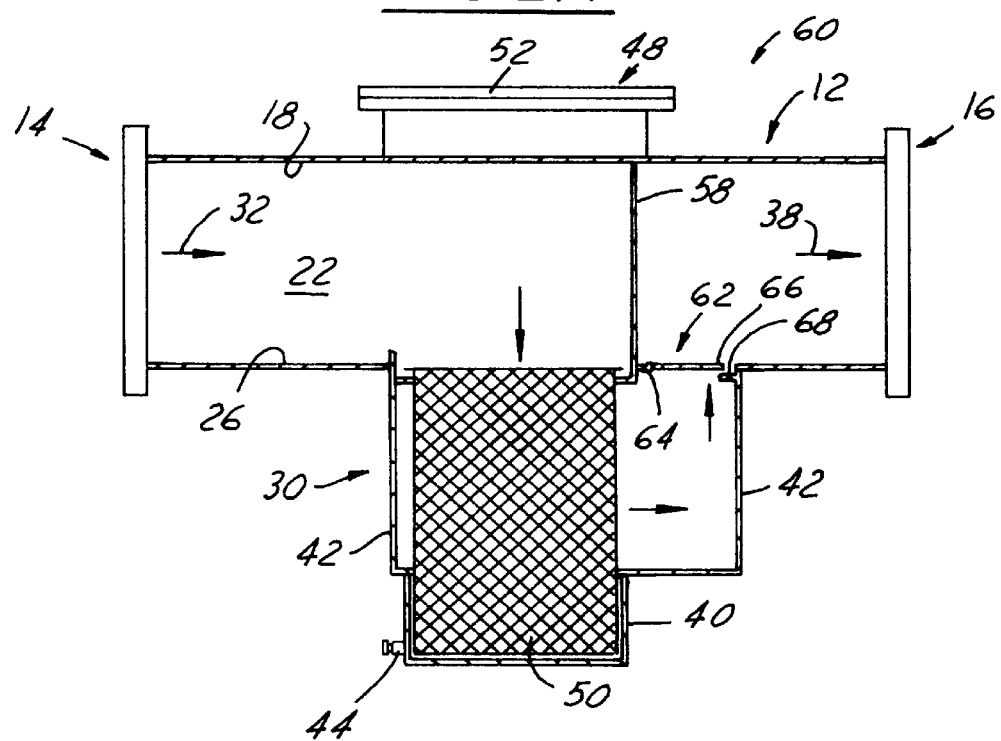
FIG. 2B is a cross-sectional view of the second preferred embodiment of the present invention integrated check valve/strainer-filter assembly.

Referring now to FIGS. 2A and 2B wherein a second preferred embodiment of the present invention integrated check valve/strainer-filter assembly 60 is shown. FIG. 2A shows a plane view of the apparatus 60 while FIG. 2B shows a cross-sectional view of the assembly 60. In this second preferred embodiment, while the construction of most components remain the same as that shown in the first preferred embodiment of FIGS. 1A and 1B, the major difference is the location of the check valve 62. Instead of the check valve 36 being installed in the passageway 22 of the elongated conduit 12, the check valve 62 is installed in a return section of the strainer-filter housing 42. The check valve 62, in this embodiment, is installed by a hinge 64 to an interior passageway partition 58 such that it swings open upwardly in the position shown in FIG. 2B. The peripheral edge 66 forms a fluid-tight seal with a baffle plate 68 formed peripherally in the strainer-filter housing 42.

In this second preferred embodiment, the check valve 62 is installed after the fluid flow 32 has passed through the filter element 50. An additional benefit is thus provided by this preferred embodiment in that chances of a contaminant build-up on the surface of the check valve is significantly reduced since most contaminating particles are trapped by the filter element 50. A contaminant build-up on the check valve 62 may lead to a sticking of the valve and thus failure of the valve to properly open upon pressure of the fluid flow 32. A drain port 44 is also provided in this construction such that any liquid cumulated in the removable section 40 of the strainer-filter 30 may be drained out of the bottom of the strainer-filter. A flange opening 48 and a flange cover 52 is similarly provided for providing access to the passageway 22 and the filter element 50. The filter element 50 may also be serviced or replaced by removing the removable section 40 of the strainer-filter 30.

Figure 3A:
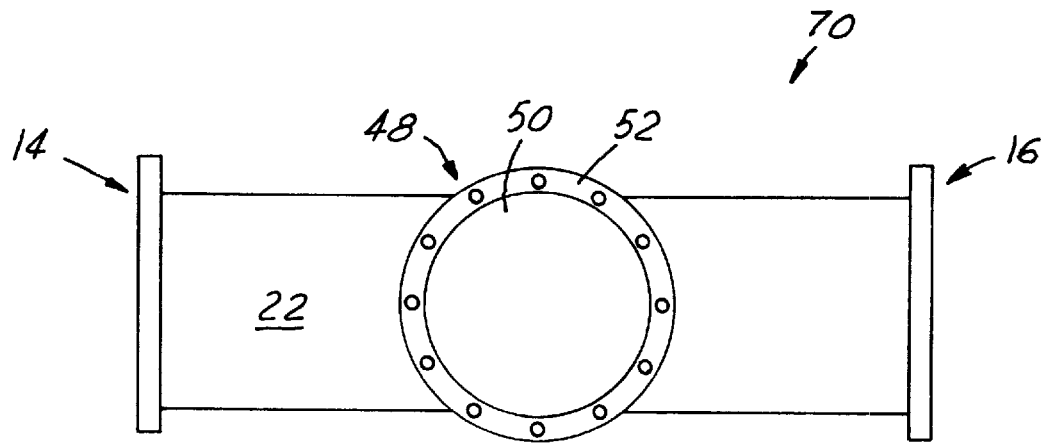
FIG. 3A is a plane view of a third preferred embodiment of the present invention integrated check valve/strainer-filter assembly.
Figure 3B:
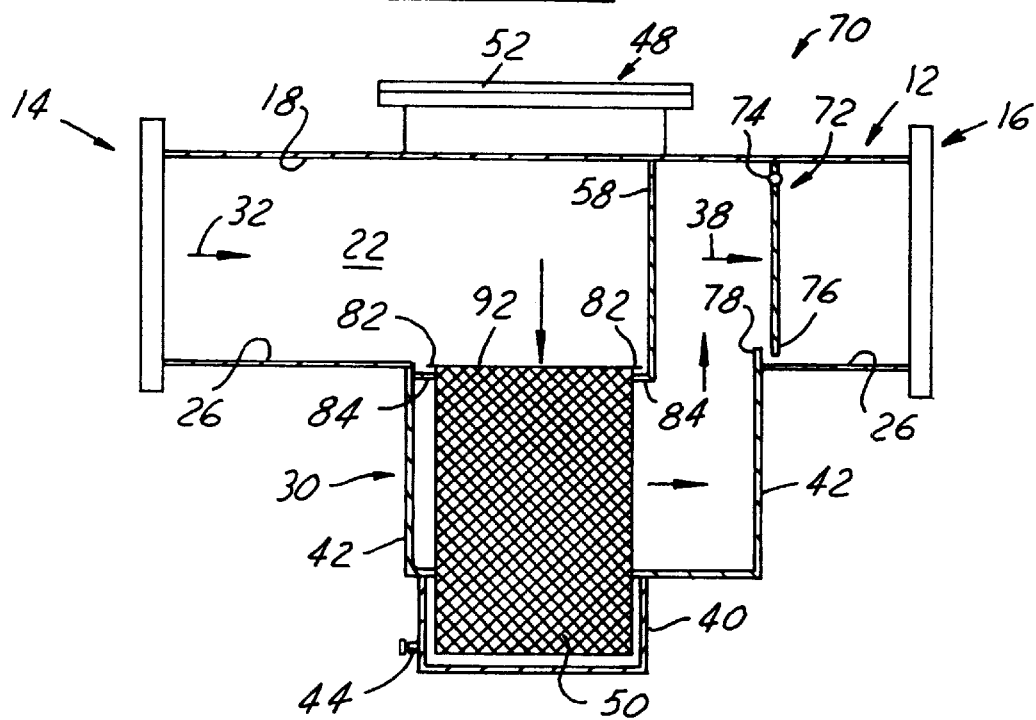
FIG. 3B is a cross-sectional view of the third preferred embodiment of the present invention integrated check valve/strainer-filter assembly.

A third preferred embodiment of the present invention integrated check valve/strainer-filter assembly 70 is shown in FIGS. 3A and 3B. A plane view of the assembly 70 is shown in FIG. 3A, while a cross-sectional view of the assembly 70 is shown in FIG. 3B. Most of the components that make up the assembly 70 are similar to the previous two preferred embodiments, with the exception of the position of the check valve 72 installed in the elongated conduit 12. Similar to the second preferred embodiment shown in FIGS. 2A and 2B, the elongated conduit 12 is divided by a partition 58 such that fluid flow 32 is diverted downwardly into the filter element 50. The filter element 50 may be constructed with an upper flange 82 which is supported by an inner flange 84 connected to the strainer-filter housing 42 and the partition 58 such that it is properly supported by the flange 84. This provides an advantageous method for installing the filter element 50 by simply dropping-in since the fluid flow 32 exerts a pressure on the top surface 92 of the filter element 50 and prevents it from unintended movement. After the fluid flow 32 enters the strainer-filter element 50, a filtered fluid flow 38 exits the filter element 50 and passes through the check valve 72 to reach the fluid exit 16. The check valve 72 is mounted by a hinge 74 to allow a swinging movement of the valve toward the fluid exit 16. The check valve 72 seals the passageway 22 in the elongated conduit 12 by the engagement between a peripheral section 76 of the valve and a flange 78 on the interior wall 26 of the conduit 12. It should be noted that the position of the check valve 72 also provides the same desirable benefit that is achieved by the construction in the second preferred embodiment, i.e., only a filtered fluid flow 38 passes through the check valve 72 and thus chances of depositing undesirable contaminating materials on the valve is substantially eliminated.

A flange opening 48 and a flange cover 52 similar to those employed in the other two preferred embodiments are also provided in the assembly 70 for easy access to the filter element 50 and to the passageway 22 in the conduit 12.

The present invention novel apparatus of an integrated check valve/strainer-filter assembly has therefore been amply demonstrated in the above descriptions and in the appended drawings of FIGS. 1A–3B. The present invention novel apparatus combines two of the most frequently used fluid control components into a single compact unit and thus affording a great saving in factory floor space occupied and maintenance costs associated with such components.

While the present invention has been described in an illustrative manner, it should be understood that the terminology used is intended to be in a nature of words of description rather than of limitation.

Furthermore, while the present invention has been described in terms of three preferred embodiments, it is to be appreciated that those skilled in the art will readily apply these teachings to other possible variations of the inventions.

The embodiment of the invention in which an exclusive property or privilege is claimed are defined as follows:

1. An integrated check valve/strainer-filter assembly comprising:
    an elongated conduit having an inlet and on outlet connecting a fluid passageway thereinbetween,
    a strainer-filter joined perpendicularly to a surface parallel to a longitudinal axis of said conduit, extending from said conduit and in fluid communication with said inlet and said outlet,
    a check valve positioned in said fluid passageway between said inlet and said outlet allowing a fluid flow from said inlet to said outlet by passing through said strainer-filter, and
    an opening in said elongated conduit for removing a strainer-filter element and a flanged cover for sealingly engaging said opening.

2. An integrated check valve/strainer-filter assembly according to claim 1, wherein said strainer-filter further comprises:
    a strainer-filter housing removably and sealingly engaging said elongated conduit;
    a cavity contained in and defined by said housing for receiving a strainer-filter element, and
    a strainer-filter element positioned in said cavity.

3. An integrated check valve/strainer-filter assembly according to claim 2, wherein said strainer-filter housing is removable for servicing or replacing said strainer-filter element.

4. An integrated check valve/strainer-filter assembly according to claim 2, wherein said strainer-filter housing is joined to said elongated conduit by mechanical means.

5. an integrated check valve/strainer-filter assembly according to claim 1, wherein said assembly conveys gas or liquid.

6. An integrated one-way valve/filter assembly for conveying and filtering a fluid flowing therethrough comprising:

a conduit having an elongated body, an inlet and an outlet providing a fluid passageway therethrough, a filter joined perpendicularly to a surface parallel to a longitudinal axis of said conduit, extending from said conduit and in fluid communication with said inlet and said outlet, said filter further comprises a filter housing sealingly engaging said conduit and defining a cavity contained therein for receiving a filter element, a one-way valve mounted in said fluid passageway after said filter element allowing a uni-directional fluid flow from said inlet to said outlet passing through said filter, and an opening in said elongated conduit for removing a strainer-filter element and a flanged cover for sealingly engaging said openings.

7. An integrated one-way valve/filter assembly for conveying and filtering a fluid therethrough according to claim 6, wherein said filter is a strainer-filter effective in straining and filtering a fluid.

8. An integrated one-way valve/filter assembly for conveying and filtering a fluid therethrough according to claim 6, wherein said filter is removably jointed to said conduit for allowing said filter housing to be removed for service.

9. An integrated one-way valve/filter assembly for conveying and filtering a fluid therethrough according to claim 6, wherein said cover is sealingly engaging said opening by thread means.

10. An integrated one-way valve/filter assembly for conveying and filtering a fluid therethrough according to claim 6, wherein said fluid conveyed and filtered by said integrated one-way valve/filter assembly is a gas or a liquid.

11. An integrated one-way valve/filter assembly for conveying and filtering a fluid therethrough according to claim 6, wherein said filter is threadingly joined to said conduit such that said filter may be removed for replacement of said filter element.

* * * * *